(12) United States Patent
Jeong et al.

(10) Patent No.: US 6,588,229 B2
(45) Date of Patent: Jul. 8, 2003

(54) METHOD FOR CONTROLLING HEAT TREATMENT IN PROCESS OF FABRICATING HIGH PURITY SILICA GLASS

(75) Inventors: Won-Il Jeong, Kyongsangbuk-du (KR); Young-Min Baik, Kyongsangbuk-du (KR)

(73) Assignee: Samsung Electronics Co, Ltd., Suwon (KR)

( * ) Notice: Subject to any disclaimer, the term of this patent is extended or adjusted under 35 U.S.C. 154(b) by 266 days.

(21) Appl. No.: 09/749,017

(22) Filed: Dec. 27, 2000

(65) Prior Publication Data

US 2001/0007195 A1 Jul. 12, 2001

(30) Foreign Application Priority Data

Dec. 30, 1999 (KR) .......................... 1999-67040

(51) Int. Cl.$^7$ ................................. C03B 8/00
(52) U.S. Cl. ........................ 65/17.2; 65/111; 65/377; 65/379; 65/382; 65/424; 65/426; 65/427; 65/395; 65/900; 65/901; 34/402; 34/405; 34/413; 34/417; 34/437
(58) Field of Search ................. 65/17.2, 29.15, 65/111, 157, 160, 377, 379, 382, 424, 426, 427, 395, 900, 901; 34/402, 405, 413, 417, 437

(56) References Cited

U.S. PATENT DOCUMENTS

| | | | | |
|---|---|---|---|---|
| 4,317,668 A | * | 3/1982 | Susa et al. .................. 65/17.2 |
| 5,158,587 A | * | 10/1992 | Kyoto et al. .................. 65/426 |
| 5,240,488 A | | 8/1993 | Chandross et al. .......... 65/3.11 |

FOREIGN PATENT DOCUMENTS

JP          11-60249          3/1999          ............. C03B/8/02

* cited by examiner

Primary Examiner—Michael Colaianni
(74) Attorney, Agent, or Firm—Cha & Reiter

(57) ABSTRACT

Disclosed is a method for controlling a heat treatment in the process of fabricating a high purity silica glass via a sol-gel process using a low temperature heater having an inhalation line and an exhaust line. Accordingly, the method includes the steps of (a) identifying whether or not the diameter of the exhaust line is varied; (b) controlling the mass flow of the process gas according to the changed diameter of the exhaust line in step (a); (c) measuring an exhaust gas velocity discharged through the exhaust line; (d) comparing the exhaust gas velocity measured in the step (c) with the exhaust gas velocity after the scale of the exhaust line is varied; and, (e) repeating steps (b)–(d) if the comparison result in step (d) is different.

8 Claims, 3 Drawing Sheets

METHOD FOR CONTROLLING HEAT TREATMENT IN PROCESS OF FABRICATING HIGH PURITY SILICA GLASS

CLAIM OF PRIORITY

This application claims priority to an application entitled "Method for Controlling Heat Treatment in Process of Fabricating High Purity Silica Glass" filed with the Korean Industrial Property Office on Dec. 30, 1999 and there duly assigned Ser. No. 1999-67040.

BACKGROUND OF THE INVENTION

1. Field of the Invention

The present invention relates generally to a method for fabricating a silica glass and in particular, to a method for controlling the heat treatment used to remove impurities during the fabrication of a high purity silica glass.

2. Description of the Related Art

It is highly desirable to obtain optical communication systems with high speed transmission capabilities and low loss communications through optical fibers made from a preform composed of a silica glass.

The silica glass is fabricated by using a quartz raw material process, a synthetic quartz grain process, or a sol-gel process. Particularly, the silica glass fabrication method via the sol-gel process is disclosed in detail in U.S. Pat. No. 5,240,488, entitled "Manufacture of vitreous silica product via a sol-gel process using a polymer additive".

FIG. 1 is a flow chart illustrating the process of fabricating a silica glass via a sol-gel process according to the prior art. Referring to FIG. 1, the conventional method for fabricating the silica glass via the sol-gel process consists of a sol forming step 10, a molding step 20, a gel aging step 30, a de-molding step 40, a drying step 50, a low heat processing step 60, and a sintering step 70 in sequence. The process for fabricating a tubular silica glass, such as a substrate tube and an over-jacketing tube, will be described herein below.

The sol-gel forming step 10 is characterized by mixing starting materials with de-ionized water and an additive, such as a dispersant or the like, to form an uniform sol. The starting materials are generally selected from either a silicon alkoxide for forming a polymeric sol or a fumed silica for forming a colloidal sol.

Then, the molding step 20 is performed to inject the sol generated through the sol forming step 10 into a mold with a specific shape to form a gel. A binder for coupling particles or an additive, such as an accelerator for gel forming, is added to the sol.

Next, the gel aging step 30 is performed to remove a central rod from the mold and then performs the aging process for the molded composition.

Subsequently, the de-molding step 40 is performed to separate the aged gel from the mold. During the de-molding step 40, water pressure is used within a reservoir in order to protect the aged gel from damage.

Thereafter, the dry step 50 is performed to dry the aged gel separated from the mold in the de-molding step 40 in a humidity chamber by applying constant temperature in order to form a first dried gel. After the constant temperature and humidity drying, a second drying is performed under constant temperature and humidity.

Then, the low heat processing step 60 is performed to apply heat treatment on the dried gel with a gas (i.e., chlorine, hydrogen, oxygen, etc.) to decompose organic materials (i.e., residual moisture and binder within the dried gel) to remove impurities (i.e., metallic impurities and OH groups). The low heat processing step 60 is sometimes referred to as a purifying step as this type of process removes impurities within the dried gel as earlier.

Finally, the sintering step 70 is performed to sinter the dried tubular gel obtained during the low heat processing step 60 at a high temperature to produce a final product-namely, a silica glass. The sintering phase 70 applies heat up to 1450 degree C. to the purified and dried gel inside a sintering furnace, which is longitudinally movable while being exposed to He gas. After the sintering step 70, a high purity silica glass, such as a substrate tube or an over-jacketing tube, is finally obtained.

In particular, the low heat processing step 60 is typically performed under a low temperature heater with an inhalation line and an exhaust line. In order to obtain a low-heat-treated gel having a uniform distribution throughout the low heat processing step 60, the pressure within the low temperature heater should be maintained constant. This is because residual moisture, organic additives, metallic impurities, and any hydroxyl group within the dried gel is affected by the pressure within the low-temperature heater. Other factors that may influence the pressure within the heater include a mass flow of the process gas supplied into the inside of the low-temperature heater via the inhalation line, the pressure of the exhaust gas, the size of the exhaust line, etc.

During the low heat processing step 60, the size of the exhaust line needs to be frequently changed due to a component conversion in the conventional low heat process. The diameter of the exhaust line may be often subject to a certain degree of change depending upon the capacity of the heat treatment equipment or heater in use. For example, as the capacity of the heat treatment increases from 1 gel/cycle to 4 gels/cycle, the diameter of the exhaust line also needs to change from ½ inch to 1 inch. However, when the exhaust line changes, causing a change in the mass flow of the process gas, the process pressure within the low temperature heater is accordingly affected, thereby deteriorating the quality of the dried gel. For example, when the mass flow of the process gas is abruptly changed in the exhaust line to a larger diameter, the velocity of the exhaust gas will decrease, which in turn will change the process pressure within the low-temperature heater. Then, the result of change in the process pressure will disadvantageously deteriorate the quality of the dried gel undergoing the low heat processing. Therefore, there is a need to provide a mechanism to maintain the process pressure during the low heat treatment of the fabrication of a high-purity silica glass.

SUMMARY OF THE INVENTION

It is, therefore, an object of the present invention to provide a method for controlling the heat treatment during the fabrication process of a high-purity silica glass, so that a silica glass having a uniform distribution can be produced even when the size of an exhaust line of the low-temperature heater is changed abruptly.

Accordingly, the present invention provides a method for maintaining a constant gas pressure within a low-temperature heater with an inhalation line and an exhaust line during one of the sol-gel process used to fabricate a high-purity silica glass, the method comprising the steps of: detecting whether the diameter of the exhaust line is changed; selectively adjusting the flow of gas inputted to the inhalation line of the low temperature heater if the diameter of the exhaust line is changed; measuring an exhaust gas velocity discharged through the exhaust line; and, comparing the current exhaust gas velocity with a previous exhaust gas velocity before changing the diameter of the exhaust line.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
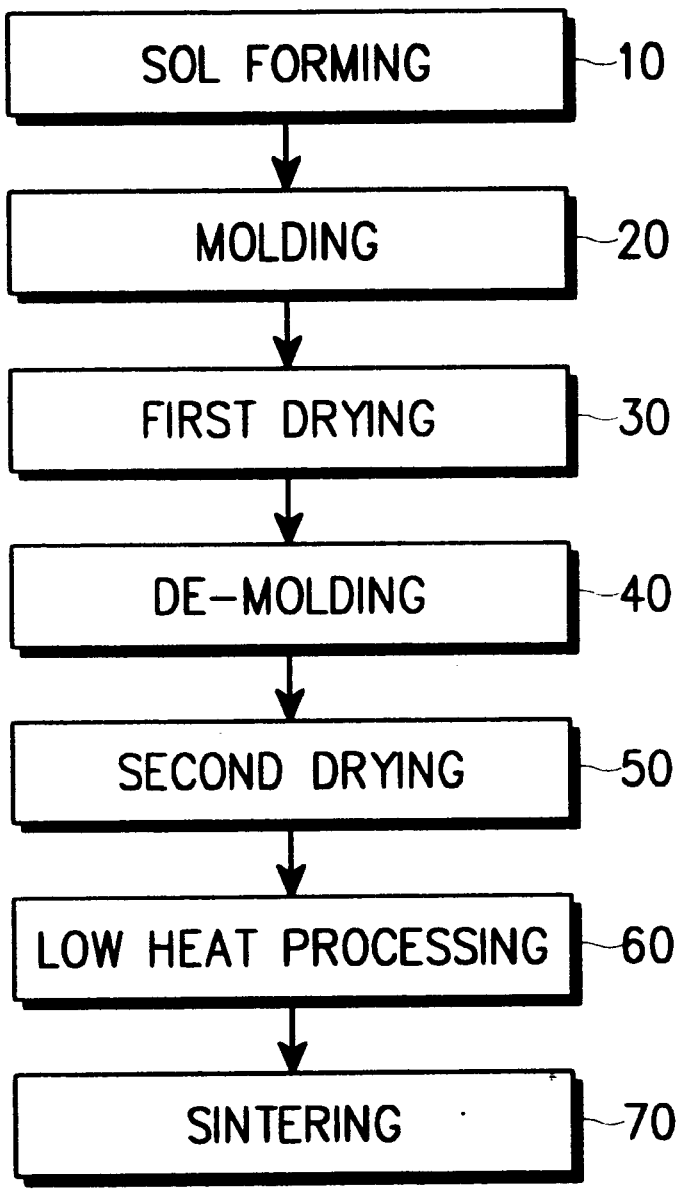
FIG. 1 is a flow chart illustrating a method for fabricating a high purity silica glass via a sol-gel process according to the prior art.
Figure 2:
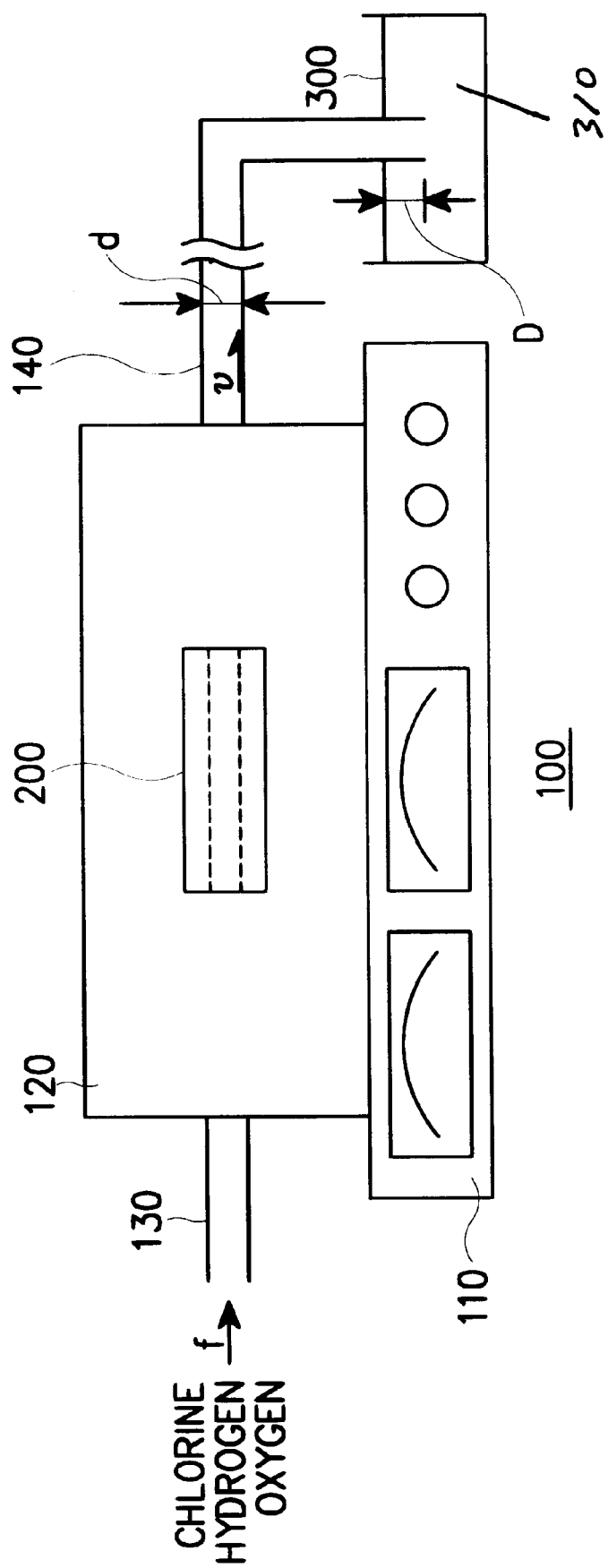
FIG. 2 is a schematic view illustrating the low temperature heater according to a preferred embodiment of the present invention; and, FIG. 3 is a flow chart illustrating a method for controlling the heat treatment according to a preferred embodiment of the present invention.

FIG. 2 is a schematic view illustrating the major components of the low temperature heater 100 used during a low heat processing step according to a preferred embodiment of the present invention. Basically, the low temperature heater 100 comprises a base 110 having a manometer and a hydrometer; a chamber installed on the base 110 for removing impurities within a dried gel 200 disposed in the chamber by providing a gas inside the chamber; an inhalation line 130 installed at one end of the chamber for acting as a passageway for the gas directed from a gas reservoir to the inside of the chamber 120; an exhaust line 140 installed at the other end of the chamber 120 for acting as a passageway of a residual gas exhausted after the purification process of the dried gel 200; and, a suspension reservoir 300, in which suspension 310 (i.e. water-type solution) is stored, having one end of the exhaust line 140 submerged in the suspension 310. The inhalation line 130 has a control valve and a flow-meter for controlling the mass flow of the gas, and a hydrometer for measuring the velocity of the exhaust gas.

Figure 3:
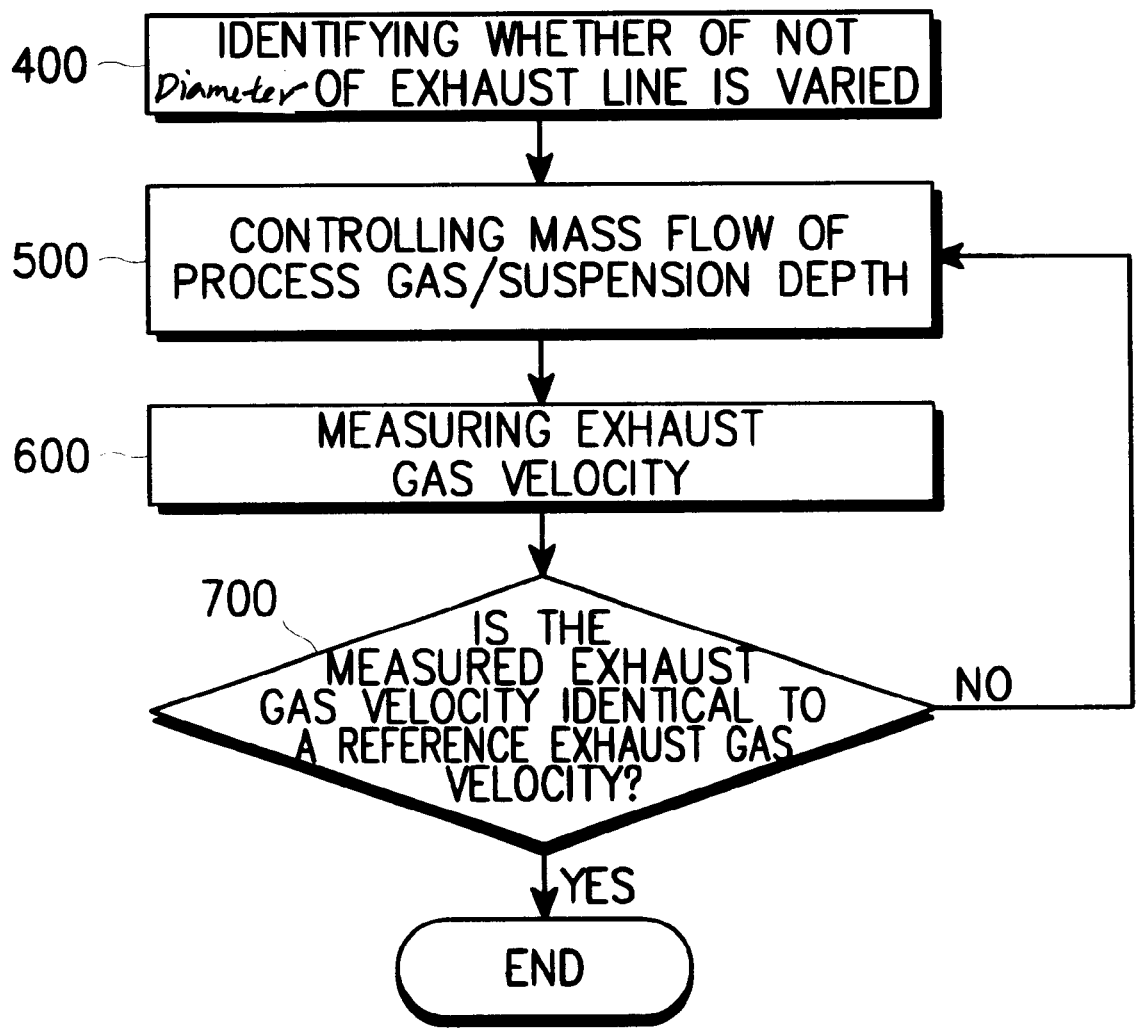

FIG. 3 is a flow chart illustrating the method for controlling the heat treatment process according to the preferred embodiment of the present invention. Referring to FIGS. 2 and 3, the method for controlling the heat treatment includes multiple steps, as below.

In step 400, it is determined whether or not the diameter of an exhaust line 140 of the low temperature heater 100 is changed. To be specific, if the exhaust line 140 of the low temperature heater 100 is changed, the first step 400 compares the size of an existing exhaust line and that of the alternated exhaust line, so as to identify how much scale is varied. The comparison step can be executed manually using a vernier calper or a micrometer by an operator.

In step 550, if the diameter of the exhaust line is changed in step 400, the mass flow (f) of the process gas and/or the suspension depth D in the reservoir 300 is selectively adjusted accordingly. In particular, the mass flow of the process gas, i.e., chlorine, hydrogen, oxygen, etc., provided inside the heater 100 through an inhalation line 130 is increased or decreased by controlling the opening of the control valve in the inhalation line 130. Thus, by adjusting the input gas flow at the inhalation line 130, the pressure within the low temperature heater 100 can be controlled to remain constant. Alternatively, by adjusting the suspension depth D, as shown in FIG. 2, the pressure within the low temperature heater 100 can be controlled to remain constant when the diameter of the exhaust line is varied. Therefore, two parameters are selectively adjusted to maintain the gas pressure in the chamber 120 to be constant. In particular, when the exhaust line 140 is changed causing the velocity of the gas passing through the exhaust line 140 to change, which in turn causes the gas pressure in the chamber 120 to change, the mass flow of the gas (f) and/or the suspension depth D can be selectively adjusted so that the pressure within the low temperature heater 100 is unchanged.

Thereafter, in step 600, the exhaust gas velocity (v) discharged through the exhaust line 140 is measured in order to identify whether or not the pressure within the low temperature heater 100 is maintained constant.

In step 700, the exhaust gas velocity (v) measured in step 600 is compared to a reference exhaust gas velocity, namely, the exhaust gas velocity before changing the exhaust line 140. If they are not the same, step 500 is performed again in order to equalize these two velocities. If the exhaust gas velocity before and after changing the exhaust line 140 is the same, then the process pressure within the low temperature heater 100 is determined to be constant. Thus, the present invention uses the exhaust line velocity as a reference point so that other parameters, i.e., the input gas flow of the inhalation line 130 and/or the suspension depth D in the reservoir 300, are selectively adjusted to maintain the same velocity before and after changing the exhaust line 140.

TABLE 1

|  | Mass flow of process gas (sccm) | Diameter of exhaust gas (inch) | Velocity of exhaust gas (meter/sec) |
| --- | --- | --- | --- |
| Example 1 | 1500 | 0.5 | 0.1974 |
| Example 2 | 1500 | 1.0 | 0.0494 |
| Example 3 | 3000 | 1.0 | 0.0986 |
| Example 4 | 6000 | 1.0 | 0.1974 |

TABLE 1 illustrates a working example of the inventive method. The data collected in table 1 specifies actual results from the experiment in which the mass flow of the gas is adjusted to obtain a constant exhaust gas velocity. The exhaust gas velocity is a factor for identifying whether there is a variance of the exhaust pressure within the low-temperature heater 100.

Example 1 represents the mass flow of the process gas and the exhaust gas velocity prior to changing the exhaust line 140. Example 2 represents the corresponding exhaust gas velocity after doubling the diameter of the exhaust line 140, while maintaining the previous mass flow of the process gas. Example 3 represents the corresponding exhaust gas velocity when the mass flow of the process gas is doubled. Example 4 represents the corresponding exhaust gas velocity when the mass flow of the process gas is increased four times when the exhaust line was doubled. As illustrated in TABLE 1, if the diameter of the exhaust line 140 is increased twice, the mass flow of the process gas has to be increased four times in order to maintain the exhaust gas velocity before the change. In other words, the mass flow of the process gas is increased four times when the diameter of the exhaust line 140 is doubled.

Similarly, the depth D of FIG. 2 at which one end of the exhaust line 140 is submerged in the reservoir 300 can be selectively adjusted to maintain the same exhaust line velocity as described above. In the experiment, it is determined that the corresponding depth should be decreased at an increment as the diameter of the exhaust line is increased. Thus, the exhaust line speed and the pressure inside the heater 100 can be maintained constant by adjusting the depth distance to an optimal length.

As stated above, the method for controlling the heat treatment in the process of fabricating the high purity silica glass according to the preferred embodiment of the present invention has the advantage of producing the silica glass of uniform distribution by constantly maintaining the exhaust gas velocity by controlling the mass flow of the process gas or the suspension depth, so that process pressure within the low temperature heater is maintained constant in the event that the diameter of the exhaust line in the low-temperature heater is changed.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for maintaining a constant gas pressure within a low-temperature heater having an inhalation line and an exhaust line during one of the sol-gel process used to fabricate a high-purity silica glass, the method comprising the steps of:

(a) detecting whether the diameter of said exhaust line is changed;

(b) selectively adjusting a flow of gas inputted to said inhalation line of said low temperature heater if the diameter of said exhaust line is changed;

(c) measuring an exhaust gas velocity discharged through said exhaust line; and, (d) comparing a current exhaust gas velocity measured in step (c) with a previous exhaust gas velocity before changing the diameter of said exhaust line.

2. The method of claim 1, further comprising the step of repeating steps (b)–(c) if said comparison result in step (d) is different.

3. The method of claim 1, wherein the flow of said process gas inputted to said inhalation line is increased in proportion to the changed diameter of said exhaust line.

4. The method of claim 1, further comprising the step of monitoring the flow of said gas inside said low-temperature heater.

5. A method for maintaining a constant gas pressure within a low-temperature heater having an inhalation line, an exhaust line during one of the sol-gel process used to fabricate a high-purity silica glass, wherein one end of said exhaust line is submerged in a perpendicular direction to a reservoir by a prescribed distance, the method comprising the steps of:

(a) detecting whether the diameter of said exhaust line is changed;

(b) selectively adjusting said prescribed distance representing a depth distance at which said end of said exhaust line is submerged in said reservoir if the diameter of said exhaust line is changed;

(c) measuring an exhaust gas velocity discharged through said exhaust line; and (d) comparing a current exhaust gas velocity measured in step (c) with a previous exhaust gas velocity before changing the diameter of said exhaust line.

6. The method of claim 5, further comprising the step of repeating steps (b)–(d) if said comparison result in step (d) is different.

7. The method of claim 5, further comprising the step of decreasing said depth distance at an increment if the diameter of said exhaust line is increased in step (b).

8. The method of claim 5, further comprising the step of monitoring the flow of said gas inside said low-temperature heater.

* * * * *